United States Patent [19]
Kumley et al.

[11] Patent Number: 5,046,365
[45] Date of Patent: Sep. 10, 1991

[54] TRANSDUCER THERMAL PROTECTION SYSTEM

[75] Inventors: Marvin A. Kumley, Dallas, Oreg.;
Daniel L. Simpson, San Diego, Calif.;
Kurt W. Swanson, Kent, Wash.;
Bryan L. Beck, Temecula, Calif.

[73] Assignee: General Dynamics Corporation/Space Systems Div, San Diego, Calif.

[21] Appl. No.: 553,033

[22] Filed: Jul. 16, 1990

[51] Int. Cl.[5] ............................................. G01L 19/04
[52] U.S. Cl. ........................................ 73/708; 73/431; 73/756; 361/386
[58] Field of Search .......................... 73/708, 431, 756; 361/386, 383

[56] References Cited
U.S. PATENT DOCUMENTS 4,578,994  4/1986  Bedard, Jr. et al. ................. 73/708
4,986,126  1/1991  Lawless .............................. 73/708

Primary Examiner—Donald O. Woodiel
Attorney, Agent, or Firm—John R. Duncan; Frank D. Gilliam

[57] ABSTRACT

The disclosure is directed to a thermal protection systems for protecting instrumentation transducers having a low maximum operating temperature in the range of 200 degree F. to 900 degrees F. when exposed to operating environment greater than 2000 degrees F. The embodiments of the protection system include the use of zinc solid-to-liquid phase change as a heat sink, water-to-steam phase change as a heat sink and thermal electric cooling combined with a multi-foil insulation material.

8 Claims, 3 Drawing Sheets

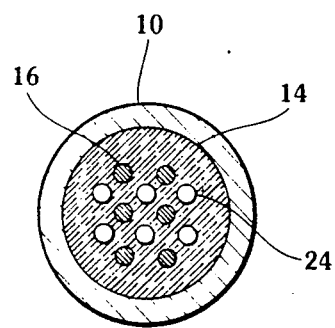
FIG. 5
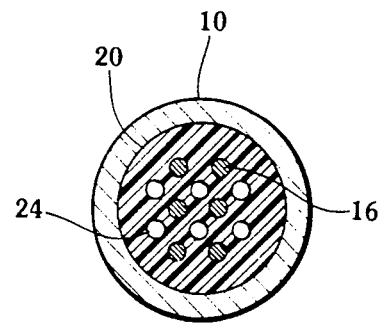
FIG. 6
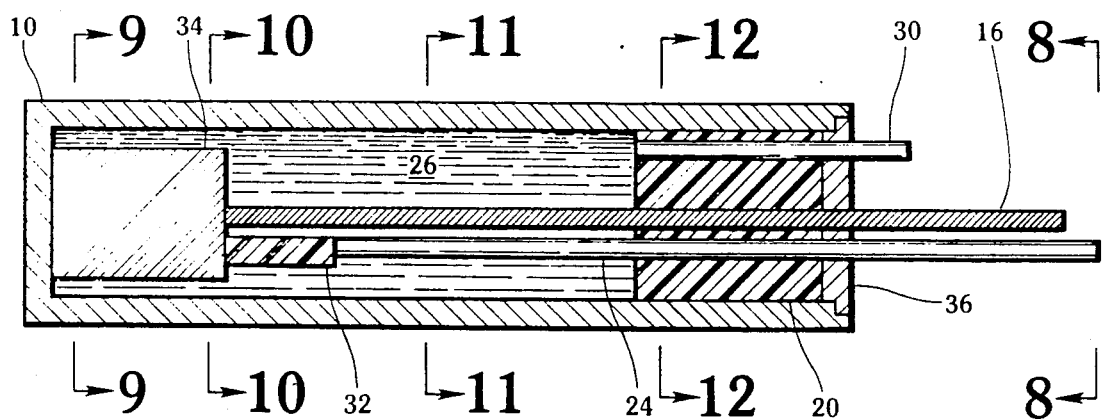
FIG. 7
FIG. 8

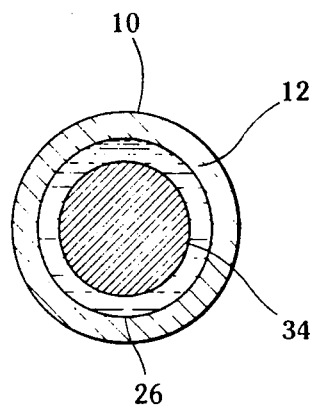
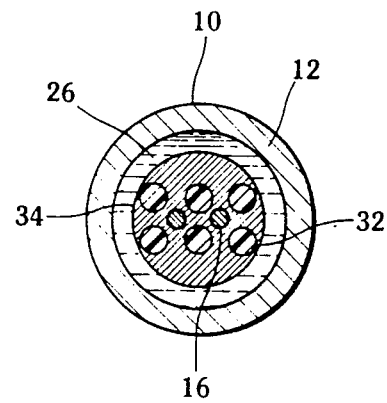
FIG. 9  FIG. 10
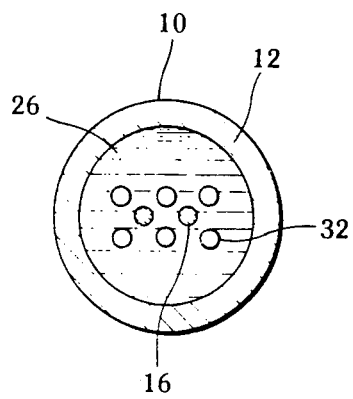
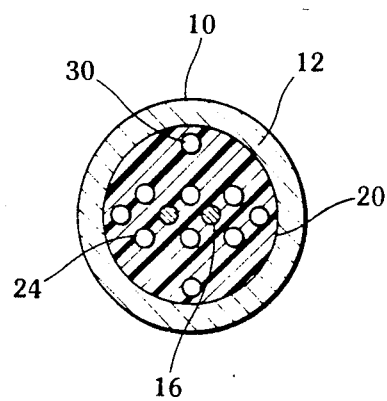
FIG. 11  FIG. 12
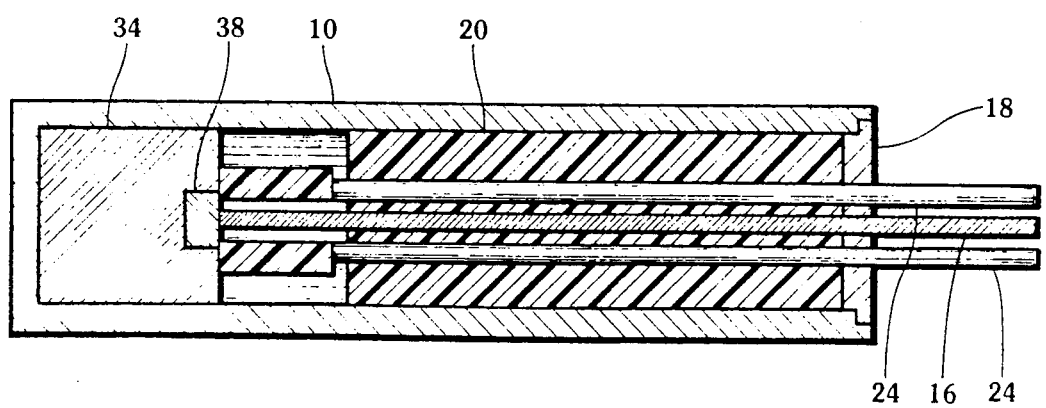
FIG. 13

TRANSDUCER THERMAL PROTECTION SYSTEM

BACKGROUND OF THE INVENTION

The invention is directed to heat sink and insulation systems and more particularly to thermal protection systems for all types of transducers used in instrumentation so that those transducers can be used in high temperature environments where the environmental temperature exceed the maximum high temperature limits of those transducers.

Generally stated, sensors and/or signal conditioning components have a low maximum operating temperature in the range of from 200 to 900 degrees F. and cannot be directly utilized in areas that exceed these temperature range limits. In many areas it becomes necessary to monitor these areas. Presently, monitoring or signal conditioning in these required high temperature areas is virtually impossible.

There has not been an entirely satisfactory method or means for taking instrumentation readings from sensors or conditioning signals until the emergence of the present invention.

SUMMARY OF THE INVENTION

This invention is directed to the thermal protection of low heat tolerance instrumentation and signal conditioning devices. As aforementioned, sensors such as pressure and signal conditional components, for example, generally have a low maximum operating temperature (200 degrees F. to 900 degrees F.). To remain operative and operate accurately during exposure to environment temperatures greater than 2000 degrees F. suitable thermal protection is required.

Protection can be accomplished by using phase change heat sinks and thermoelectric cooling along with a multi-foil insolation around the sensor.

In a first embodiment, the solid-to-liquid phase change of zinc metal is utilized to protect sensors capable of operation above the melting point of zinc which is in the order of 787 degrees F. This cooling system is completely passive and requires no maintenance of the cooling medium (zinc form solid to liquid) during its life.

In a second embodiment, water to steam is utilized for the phase change cooling medium for sensors capable of operation above 212 degrees F. The internal water holding means is allowed to vent to the atmosphere after a liquid to gas phase change. The low internal temperature (212 degrees F.) allows protection of the sensors. A refill of water after use allows repeated use.

In a third embodiment a thermoelectric transducer is used in combination of a phase change material, such as mentioned above, to maintain a maximum temperature in the range of 230 degrees F. Internal or external power is required for its operation.

The housing of each of the above embodiment is generally constructed from thin inconel foils preferably having a thickness in the range of 0.015 to 0.007 inches. A foil thickness of around 0.010 inches works well.

An object of this invention is to provide heat protection to low temperature tolerant sensors employed in a high temperature environment.

Another object of this invention is to provide solid to liquid phase change material for sensor protection in high temperature environment.

Still another object of this invention is to provide liquid to gas phase change liquid for sensor protection in high temperature environments.

Yet another object of this invention is to provide thermoelectric cooling for maintaining a constant operating temperature environment to a sensor when that sensor is positioned in a high temperature environment.

The invention, together with additional objects, features and advantages thereof, will be best understood from the following description, the appended claims and the accompanying drawing Figures in which:

BRIEF DESCRIPTION OF THE DRAWINGS

FIG. 5 is a view taken along line 5—5 of FIG. 1;

FIG. 6 is a view taken along line 6—6 of FIG. 1;

FIG. 7 is a cutaway showing of a second embodiment of the invention;

FIG. 8 is an end view taken along line 8—8 of FIG. 7;

FIG. 9 is a view taken along line 9—9 of FIG. 7;

FIG. 10 is a view taken along line 10—10 of FIG. 7;

FIG. 11 is a view taken along line 11—11 of FIG. 7;

FIG. 12 is a view taken along line 12—12 of FIG. 7; and

FIG. 13 is a cutaway showing of a third embodiment of the invention.

DETAILED DESCRIPTION OF THE PREFERRED EMBODIMENTS

Figure 1:
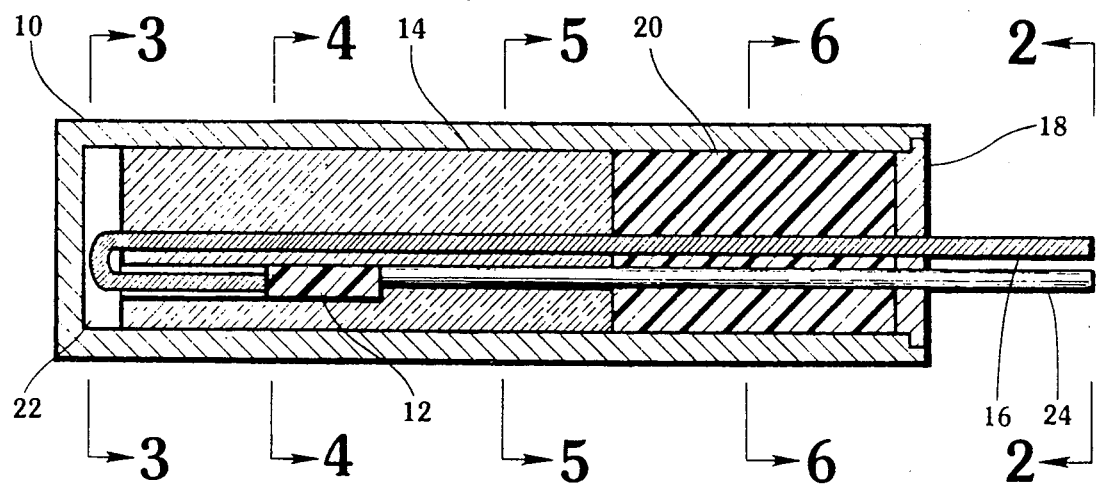
FIG. 1 is a cutaway showing of the first embodiment of the invention.
Figure 2:
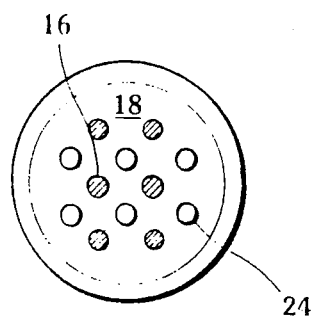
FIG. 2 is an end view taken along line 2—2 of FIG. 1.
Figure 3:
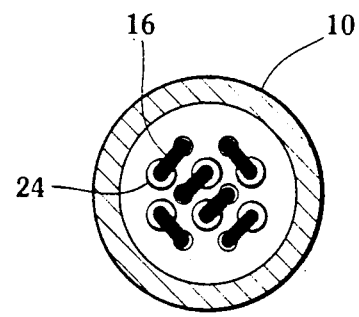
FIG. 3 is a view taken along line 3—3 of FIG. 1.
Figure 4:
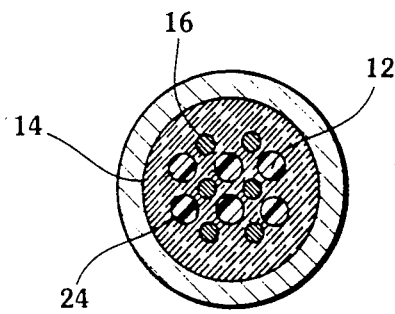
FIG. 4 is a view taken along line 4—4 of FIG. 1.

Referring now specifically to drawing FIGS. 1-6 which depicts the first embodiment of the present invention. A multi-foil constructed case or jar 10 is provide to house the particular sensor to be heat protected. This case or jar is constructed of a plurality of inconel foils sheets of approximately 0.75 mils thick. Forty inconel sheets work well for the case or jar construction. The sheets of inconel are spaced apart with Thoria spacers (explain what kind of material this is). The thoria spacers are approximately 3.5 mils thick. A plurality of six PSIA (pounds per square inch atmosphere) transducers 12 manufactured by Keller/PSI Inc. with 880 F. maximum operating temperature, only one shown in FIG. 1 for the purpose of clarity of discussion, are positioned in the case or jar 10. The transducer 12 is encased in solid zinc metal 14, at ambient temperature. Wires 16 which comprise a pair of 0.030 copper wires insulated with magnesium oxide and covered with a 0.015 thick steel shield resulting in an over all diameter of 0.10 inches. This wire is obtainable under the trade name NANMAC which is readily available. These extend through the end cap 18, see FIG. 2, the molded Mini-K insulation 20 well known in the insulation art through the zinc to a space 22 at the opposite end of the case or jar from the end cap 18. The wires 16 are formed 180 degrees and are passed through a 0.10 columbium tube 24 in which the transducer 12 is located. The tube 24 extends beyond the end cap 18 and is open to the atmosphere.

In operation the heat of the environment causes the zinc to melt at around 887 degrees F. establishing the operating temperature of the transducer 12.

Referring now specifically to drawing FIGS. 7-12 which depict a second embodiment of the invention. The housing 10 is constructed as hereinbefore described except the end cap is formed as a part of the housing. The housing 10 contains a water vessel 26 is located between one end wall 28 of the housing and a space 30 which is filed with molded Min-K insulation 20. The water vessel vents to the atmosphere through vent tubes. 30. Six PCB Model 105 PSIA transducers 32 with a maximum operating temperature of 325 F. are installed in six tubes 24, hereinbefore described. Only one transducer is shown in drawing FIG. 7 for clarity. A six transducer scanner 34 having a maximum operating temperature of 257 degrees F. is positioned at one end of the housing adjacent the transducers. Wire 16 extends from the sensor through the end wall 36 of the housing for connection to the electronic monitor system not shown.

In operation, the water vessel is filled with water and as the water is heated by the environment in which the transducer is positioned the water changes from a liquid to a gas and vents through vent tubes 30. The transducer and scanner will continue to be in a heat environment of about 212 degrees F. as long as water remains in the vessel for conversion to steam. After use the vessel can be refilled with water and reused.

Referring now specifically to drawing FIG. 13 which depicts two transducers and a scanner of the type hereinbefore shown and discussed under the discussion of FIGS. 7-12 which in addition to the previously discussed embodiments includes a thermoelectric transistor 38 the cold side of which is used for additional cooling. The transistor 38 is connected externally to a source of power.

In operation, the device of the drawing FIG. 13 further includes the cooling by means of the thermotransistor 38 in combination with phase change cooling of the previously described embodiments and can be incorporated with either.

Throughout this description the sensors have been described as pressure transducers for ease of explanation and any type sensor can be utilized in place of the pressure transducer to practice the invention.

While described above are the principles of the various transducer thermal protection systems of the invention in connection with specific apparatus it is to be clearly understood that this description is made only by way of example and not by as a limitation to the scope of the invention as set forth in the summary thereof and in the accompanying claims.

What is claimed is:

1. A solid to liquid phase transducer thermal protection system comprising:
   an outer shell having a hollow cavity therein;
   at least one transducer within said hollow cavity;
   electrical conductors connected to said at least one transducer and extending external of said shell;
   part of said hollow cavity adjacent to said at least one transducer being filled with a solid metal which melts at a preselected elevated temperature; and
   part of said hollow cavity adjacent to said solid metal being filled with molded insulation material.

2. The invention as defined in claim 1 wherein said outer shell is formed of approximately 0.010 inch thick super alloy material.

3. The invention as defined in claim 2 wherein said super alloy comprises a plurality of approximately 40 layers of approximately 0.75 mil inconel foil with the layers separated by approximately 3.5 mil thoria spacers.

4. The invention as defined in claim 1 wherein said at least one transducer is a pressure transducer.

5. The invention as defined in claim 4 wherein on side of said transducer is vented to the atmosphere.

6. The invention as defined in claim 1 wherein said electrical connectors are formed of copper and are approximately 0.030 inches in diameter.

7. The invention as defined in claim 1 wherein said solid metal is zinc which has a melting temperature of approximately 787 degrees F.

8. The invention as defined in claim 1 wherein said molded insulation material is Min-K insulation.

* * * * *